US005650001A

United States Patent [19]

Howell

[11] Patent Number: 5,650,001
[45] Date of Patent: Jul. 22, 1997

[54] COMPOSITIONS AND METHODS FOR TREATING COMPACT DISCS

[76] Inventor: Bradley Howell, 1618 7th St., Apt. D, New Orleans, La. 70115

[21] Appl. No.: 588,361

[22] Filed: Dec. 1, 1995

[51] Int. Cl.$^6$ .................................................... C09D 4/00
[52] U.S. Cl. ................. 106/287.16; 427/140; 427/163.4; 427/387
[58] Field of Search ................. 106/287.16; 427/140, 427/163.4, 387

[56] References Cited

U.S. PATENT DOCUMENTS

| | | |
|---|---|---|
| 2,261,700 | 11/1941 | Ryznar . |
| 2,356,792 | 8/1944 | Oakes et al. . |
| 2,812,263 | 11/1957 | Geen et al. . |
| 2,868,657 | 1/1959 | Sesso . |
| 2,955,047 | 10/1960 | Terry . |
| 3,071,479 | 1/1963 | Fulenwider, Jr. . |
| 3,806,460 | 4/1974 | Mukai et al. . |
| 3,836,371 | 9/1974 | Kokoszka ........................ 106/10 |
| 3,960,574 | 6/1976 | Lee ................................ 106/3 |
| 4,005,028 | 1/1977 | Heckert et al. ................. 252/140 |
| 4,005,030 | 1/1977 | Heckert et al. ................. 252/140 |
| 4,212,759 | 7/1980 | Young et al. .................. 252/111 |
| 4,269,739 | 5/1981 | Grejsner ........................ 252/547 |
| 4,347,333 | 8/1982 | Lohr et al. .................... 524/269 |
| 4,544,413 | 10/1985 | Boots et al. ................. 106/287.14 |
| 4,683,001 | 7/1987 | Floyd et al. .................... 106/3 |
| 4,689,168 | 8/1987 | Requejo ....................... 252/139 |
| 4,725,489 | 2/1988 | Jones et al. .................. 428/289 |
| 4,741,773 | 5/1988 | Kuroda et al. .................. 106/3 |
| 4,753,844 | 6/1988 | Jones et al. .................. 428/288 |
| 4,793,942 | 12/1988 | Lokkesmoe et al. .............. 252/99 |
| 4,808,329 | 2/1989 | Soldanski et al. .............. 252/102 |
| 4,859,359 | 8/1989 | DeMatteo et al. ............. 252/174.15 |
| 4,936,914 | 6/1990 | Hurley et al. .................. 106/3 |
| 5,041,235 | 8/1991 | Kilbarger ...................... 252/170 |
| 5,043,012 | 8/1991 | Shinohara et al. .............. 106/10 |
| 5,045,116 | 9/1991 | Cohen ............................ 134/6 |
| 5,080,821 | 1/1992 | Lutringer ...................... 252/170 |
| 5,080,824 | 1/1992 | Bindl et al. ................. 252/174.15 |
| 5,145,523 | 9/1992 | Halpin et al. ............... 106/287.24 |
| 5,147,575 | 9/1992 | Hampton, Sr. ................. 252/171 |
| 5,154,759 | 10/1992 | Cifuentes et al. ............... 106/3 |
| 5,174,813 | 12/1992 | Cifuentes et al. ............... 106/3 |
| 5,300,327 | 4/1994 | Stark-Kasley et al. ........... 422/387 |
| 5,354,832 | 10/1994 | Chang et al. ................ 106/287.16 |
| 5,375,285 | 12/1994 | Miura et al. ................... 15/97.1 |
| 5,397,384 | 3/1995 | Wisniewski ..................... 106/8 |
| 5,425,804 | 6/1995 | Shinohara et al. ............... 106/2 |

*Primary Examiner*—David Brunsman
*Attorney, Agent, or Firm*—Finnegan, Henderson, Farabow, Garrett & Dunner, L.L.P.

[57] ABSTRACT

A composition for treating a compact disc is disclosed and contains a urethane, a silicone, kerosene, at least one lower alcohol, and Stoddard solvent. A method for treating compact discs, such as those that are damaged, is also disclosed. The method includes the step of applying the composition of the present invention to a surface of the disc.

17 Claims, No Drawings

COMPOSITIONS AND METHODS FOR TREATING COMPACT DISCS

BACKGROUND OF THE INVENTION

The present invention relates to a composition and method for treating a compact disc to repair, restore and/or protect the disc.

Compact discs are plastic optical discs containing information, such as music, recorded thereon by an optical reader. Over time, the surface of a compact disc ("CD") can become scratched or otherwise damaged from repeated playing and handling. This can cause the disc to skip or prevent the CD player from accurately reading the information encoded on the disc, thus detracting from the high quality of the audio or visual information. Moreover, CD's are often exposed to extreme weather conditions in cars and elsewhere, such as heat, humidity, sunlight, and cold, which can cause deterioration of the metal-acrylic coating on the CD. Also, a CD must be repeatedly removed and replaced to and from the CD player and its case, and is repeatedly inserted into and ejected from the CD player, which increases the chance for damage to the disc. Thus, there is a need for a way to repair and restore damaged CD's, as well as a way to protect a CD from becoming damaged.

Prior attempts to restore and/or protect CD's have included the use of alcohol-based polishes or cleaners that are designed to clean the surface of the CD to remove dust and dirt. Such polishes/cleaners, however, are not effective in restoring or preventing skips or loss of audio/visual quality as a result of scratches from handling or exposure to weather conditions.

Other attempts to restore or protect CD's have included applying wax-type compositions to the surface of the CD. Such wax-based products, however, suffer from poor adhesion to the surface of the CD, and lack of durability upon exposure to heat. Specifically, wax-based compositions begin to soften and decompose upon exposure to temperatures approaching 100° F. Therefore, exposure to temperatures often experienced inside cars can cause wax-based coatings to soften and decompose, thereby ruining the internal parts of the CD player.

SUMMARY OF THE INVENTION

Accordingly, the present invention is directed to a composition and method for treating compact discs that substantially obviate one or more of the problems due to limitations and disadvantages of the related art. The composition includes urethane, silicone, kerosene, at least one lower alcohol, and Stoddard solvent. The composition preferably also includes an ester of an alcohol and an inorganic acid such as ethyl sulfate, and an organo silicon compound. A preferred formulation also includes an aqueous saline solution. The at least one lower alcohol is preferably ethyl alcohol and isopropyl alcohol. A preferred composition of the invention includes, in weight percent:

| | |
|---|---|
| Urethane | about 5–15% |
| Silicone | about 10–30% |
| Kerosene | about 5–30% |
| Ethyl alcohol | about 12–42% |
| Stoddard solvent | about 4–20% |
| Ethyl sulfate | about .01–5% |
| Isopropyl alcohol | about 0.7–10% |
| Organosiloxanes | about 0.1–7% |
| Aqueous saline solution | balance. |

The present invention is also directed to a method of treating compact discs including applying the composition of the invention to the surface of a compact disc to repair or prevent damage to the disc. A preferred method of the invention includes the steps of:

applying a first coating of the composition of the invention to the surface of the compact disc;

applying a second coating of the composition of the invention to the surface of the compact disc;

allowing the coatings to dry; and wiping the surface of the compact disc with a dry cloth.

It is to be understood that both the foregoing general description and the following detailed description are exemplary and explanatory only and are not restrictive of the invention, as claimed.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

DETAILED DESCRIPTION OF THE INVENTION

In accordance with the invention, as embodied and broadly described herein, a composition is provided for treating a compact disc. The composition includes urethane, silicone, kerosene, at least one lower alcohol and Stoddard solvent. The composition also preferably includes one or more of the following: ethyl sulfate, organosiloxanes and saline solution (or water).

The silicone present in the composition can be any silicone that will stay in solution and exhibit the desired properties for treating CDs. The silicone is present in the composition of the present invention in an amount preferably ranging from about 5 percent to about 15 percent by weight of the total composition, more preferably about 9 percent by weight of the total composition. Preferred silicones are hexamethyl-cyclotrisiloxane (CAS #541-05-9), tris(trimethylsilyl)arsenous acid (CAS #55429-299-3), and tris (trimethylsilyl)hydroxylamine (CAS #21023-20-1). More preferably, at least about 25 wt.% (based on the total weight of silicone present) of the hexamethyl-cyclotrisiloxane, at least about 4 wt. % of the tris (trimethlsilyl)arsenous acid and at least about 1 wt. % of the tris(trimethylsilyl)hydroxylamine are present as the silicone component.

The urethane present in the composition, also known as ethyl carbonate or ethyl urethane, can be urethane, urethane derivatives, or modified urethane as long as the overall properties of the present invention's composition are satisfied. The amount of urethane present preferably ranges from about 5 to about 15 percent by weight of the total composition, more preferably about 9 percent by weight of the total composition.

Kerosene is a mixture of hydrocarbons, also known as petroleum distillates, is the fraction in distillation between gasoline and the oils, and is available from Vecom USA, Inc. as 8008-20-6. The kerosene is present in the composition of the invention in an amount preferably ranging from about 5 to about 30 percent by weight of the total composition, more preferably about 15 percent by weight of the total composition.

Kerosene, as that term is used herein, is obtained from the distillation of petroleum, and has a density of 0.81, a boiling range of 180°–300° C., a flash point of 100°–150° F. (37.7°–65.5° C.), an auto ignition temperature of 440° F. (228° C.).

The distillation profile of kerosene is given in *Perry's Chemical Engineer's Handbook Sixth Edition* FIGS. 13–71 to 13–75 and especially FIGS. 13–71 and 13–73, which is incorporated herein by reference. Equivalents of kerosene include JP-4, heavy naphtha and diesel fuel, the distillation profiles of which are also given in *Perry's Chemical Engineer's Handbook Sixth Edition*, FIGS. 13–71 and 13–73. Accordingly the term "kerosene material" as used herein is intended to include kerosene and the foregoing equivalents.

The composition of the invention also includes at least one lower alcohol. The expression "lower alcohol" is intended to include straight chain or branched chain aliphatic or alicyclic alcohols, as well as their unsaturated counterparts, having up to about 6 carbon atoms, and especially those alcohols that do not have a noxious odor. Mixtures of alcohols can be used, especially 2, 3 or 4 component mixtures. Examples of these alcohols include, but are not limited to: methyl, ethyl, propyl, isopropyl, butyl, isobutyl, cyclopentyl and cyclohexyl alcohols, and the like. Preferably the lower alcohol includes both ethyl alcohol and isopropyl alcohol. The ethyl alcohol is preferably present in an amount ranging from about 12 to about 42 percent by weight of the total composition, more preferably about 32% by weight. The isopropyl alcohol is preferably present in an amount ranging from about 0.7 to about 5 percent by weight of the total composition, more preferably about 5% by weight. Both the ethyl alcohol and isopropyl alcohol are available from Vecom USA, Inc.

The composition of the invention also includes Stoddard solvent, which is a common name for petroleum distillates widely used as dry cleaning solvents. Stoddard solvent is a widely used dry-cleaning solvent conforming to US Bureau of Standards ASTM D-484-52, a petroleum distillate clear and free from suspended matter and undissolved water and free from rancid and objectionable odor. The minimum flash point is 100° F. (37.7° C.). The distillation range is more than 50% over 350° F. (177° C.), 90% over 375° F. (190° C.) and the end point below 410° F. (210° C.). The auto ignition temperature is 450° F. (232° C.). The Stoddard solvent is preferably present in the composition of the invention in an amount ranging from about 4 to about 20 percent by weight of the total composition, more preferably about 16%. Stoddard solvent is available from Vecom USA, Inc. as 8052-41-3.

An inorganic acid ester of a lower alcohol is also employed where the inorganic acid is based on the nitrogen inorganic acids, phosphorous inorganic acids or sulfur inorganic acids, all of which are known in the art. The lower alcohol has been previously defined herein. The esters include compounds such as ethyl nitrite, butyl nitrite, t-butyl nitrate, diethyl phosphite, triethyl phosphate, triethyl phosphite, ethyl sulfate and diethyl sulfate. Materials such as trimethyl phosphite and dimethyl sulfate are not preferred since they are suspected carcinogens. Accordingly, the esters of the inorganic acids are preferably based on the aforementioned lower alcohols having from 2 to about 6 carbon atoms and include mixtures of esters within the same or different families of acids especially the two component mixtures or the three component mixtures. Preferred esters comprise ethyl sulfate and diethyl sulfate. Ethyl sulfate is employed in an amount preferably ranging from about 0.01 to about 2 percent by weight of the total composition, more preferably about 2% by weight. Ethyl sulfate is available from Vecom USA, Inc.

The composition of the invention also preferably includes small amounts of organosilicon compounds, such as siloxanes preferably having the formula $R_2SiO$ where R is an alkyl or aryl group. The various organo silicon compounds that may be employed according to the invention comprise organosilanes, organosiloxanes and organosilazanes. Examples of these compounds include materials such as the substituted or unsubstituted polymethylhydrosiloxanes used in the textile industry and which are soluble in water or organic solvents and the following compounds:

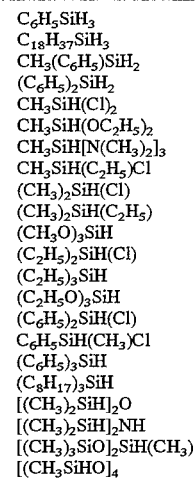

In addition, organo silicon compounds that may be employed according to the invention comprise silicon ethers and esters. Silicon esters are silicon compounds that contain an oxygen bridge from silicon to an organic group e.g., SiOR, sometimes referred to as alkoxysilanes when the organo group is an alkyl moiety. Examples of these compounds include tetraethoxysilane, tetramethoxysilane, tetrabutoxysilane, and hexakis (2-ethylbutoxy) disiloxane. Tetramethoxysilane, can be absorbed into corneal tissue, causing eye damage and accordingly, is not one of the preferred materials in this regard. Liquid ester polymers that also contain siloxane bonds, i.e., Si—O—Si are also employed.

Various siloxane oligomers sometimes referred to as silicone fluids are also suitable for application in the present invention and include compounds such as:

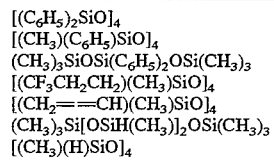

Other silicone fluids that may be employed in this regard include:

$CH_3(C_6H_5)SiO$
$CH_3(C_6H_5)SiO$
$CH_3(C_6H_5)SiO$
$(C_6H_5)_2SiO$
tetrachlorophenyl siloxane
$CH_3(H)SiO$
$CF_3CH_2CH_2(CH_3)SiO$
$(CH_3)SiO_{1.5}$.

It is believed by the applicant that these organo silicon compounds add to the durability and stability of the composition. There are two organosiloxanes found in the composition having the formulae $CH_3SiO$ and $C_2H_5SiO$. The compositions also includes $H_2SiO$. The organo silicon compounds (including $H_2SiO$) are present in an amount preferably ranging from about 0.1 to about 7.0 percent by weight of the total composition, more preferably about 0.5% by weight.

The balance of the composition of the invention is preferably made up of an aqueous saline solution available from Vecom USA, Inc.

The preferred composition of the invention can be made by combining the urethane, silicone, and kerosene with the ethyl alcohol, Stoddard solvent, and a siloxane at a temperature of preferably less than about 100° F., more preferably about 90° F., for preferably no more than about 30 minutes, more preferably about 15 minutes. In a separate vessel, the ethyl sulfate is combined with isopropyl alcohol and the remaining siloxanes by mixing at a temperature preferably less than about 95° F., more preferably 90° F. for no more than preferably about 22 minutes, more preferably about 10 minutes. The two mixtures are combined at ambient temperature with stirring for about 10 minutes.

In accordance with the invention, as embodied and broadly described herein, a method is provided for treating a compact disc. The method involves applying to the surface of a compact disc the composition of the invention. Preferably, the method involves applying a first coating of the composition of the invention to the surface of a compact disc, applying a second coating of the composition of the invention to the surface of the disc, allowing the coatings to dry, and wiping the surface of the compact disc with a dry cloth. The coatings are preferably applied by wiping the disc in a circular motion. If the disc has deep scratches, more than two coatings may be required. It is preferable that the cloth used for applying the composition of the invention be a thin, lint-free cloth and that a dry cloth be used for drying the disc.

The composition of the invention is useful both to prevent damage to new or undamaged CD's and to repair and restore old CD's that have been scratched or damaged to an extent that their audio/visual quality is impaired.

The present invention will be described more completely with reference to the following examples, which in no case may be regarded as limiting the invention.

EXAMPLE 1

A composition was prepared as described above containing the following ingredients, by weight:

|  |  | CAS # |
| --- | --- | --- |
| Urethane | 9% | 632-57-6 |
| Silicone | 20% | 284-12-2 |
| Kerosene | 15% | 8008-20-6 |
| Ethyl alcohol | 32% | 64-17-5 |

-continued

|  |  | CAS # |
| --- | --- | --- |
| Stoddard solvent | 16% | 8052-41-3 |
| Ethyl sulfate | 2% | 540-82-9 |
| Isopropyl alcohol | 5% | 67-63-0 |
| Organosiloxanes | 0.5% | (63148-62-9(.1%); |
| Aqueous saline |  | 70131-67-8(.2%); |
| solution | 0.5%. | 68440-59-5(.2%)). |

The above composition was used to treat 2500 compact discs that were skipping. The composition was coated onto the discs by applying the composition onto a thin, lint-free cloth and wiping the disc with the cloth in a circular motion until a uniform coating was obtained. A minimum of two coats were applied to the damaged discs, and in some cases more than two coats were needed to repair deep scratches. Out of the 2500 damaged discs that were treated, the skipping was repaired in 2439 discs, a 97.5% repair percentage.

EXAMPLE 2

Three used audio compact discs that had been treated with the composition of the invention were left on the front dash of a car for 1 week. The audio quality of the CD's was not impaired. Three used audio compact discs that had not been treated with the composition of the invention were left on the front dash of a car for 1 week. The surfaces of these untreated CD's became warped, apparently due to damage to the metal-acylic coating, and the CD player could not track the disc, thus preventing the data on the CD from being read.

EXAMPLE 3

Three used audio compact discs that had been treated with the composition of the invention were placed in a freezer at −2° F. for one hour. The audio quality of the CD's was not impaired. Three used audio compact discs that had not been treated with the composition of the invention were placed in the same freezer at −2° F. for one hour. These untreated CD's had a considerable loss of audio quality, apparently due to deterioration of the metal-acrylic coating on the disc. Also, the untreated discs became spotted and clear, visually demonstrating the damage.

EXAMPLE 4

Three used audio compact discs that had been treated with the composition of the invention were placed in ice water for one hour. The audio quality of the CD's was not impaired. Three used audio compact discs that had not been treated with the composition of the invention were placed in ice water for one hour. These untreated CD's had a considerable loss of audio quality due to deterioration of the metal-acrylic coating on the disc. Also, the untreated discs became spotted and clear, visually demonstrating the damage.

EXAMPLE 5

Three used CD's that had been coated with the composition of the invention and three used but untreated CD's were tested for scratch resistance. The treated and untreated CD's were rubbed on a wood desk with the same force. The treated CD's had no skipping, while the untreated CD's had massive skipping.

EXAMPLE 6

A point pressure test was also done using a device by OHAUS. It was found that CD's treated with the composition of the invention could withstand 12 pounds per square centimeter from a metallic point before data on the CD was damaged. In contrast, untreated CD's suffered data damage and skipping upon exposure to 2 pounds per square centimeter from the metallic point.

It will be apparent to those skilled in the art that various modifications and variations can be made to the present invention and in formulation of this invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition for treating a compact disc comprising urethane, a silicone compound, kerosene, at least one lower alcohol, and Stoddard solvent.

2. The composition of claim 1, wherein said at least one lower alcohol is ethyl alcohol and isopropyl alcohol.

3. The composition of claim 2, further comprising an inorganic acid ester of a lower alcohol.

4. The composition of claim 3, further comprising an organo silicon compound.

5. The composition of claim 4, further comprising an aqueous solution of saline.

6. A method for treating a compact disc comprising applying the composition of claim 1 to a surface of said compact disc.

7. The method of claim 6, wherein said at least one lower alcohol is ethyl alcohol and isopropyl alcohol.

8. The method of claim 7, wherein said composition further comprises ethyl sulfate.

9. The method of claim 8, wherein said composition further comprises organosiloxanes.

10. The method of claim 9, wherein said composition further comprises an aqueous solution of saline.

11. The method of claim 6, wherein said compact disc is damaged.

12. The method of claim 6, wherein said composition is applied to prevent damage to the compact disc.

13. The method of claim 6, further comprising applying a second coating of said composition to the surface of the compact disc, allowing the coatings to dry, and wiping the surface of the compact disc with a dry cloth.

14. A composition for treating a compact disc consisting essentially of, in weight percent:

| | |
|---|---|
| Urethane | about 5 to about 15% |
| Silicone | about 10 to about 30% |
| Kerosene | about 5 to about 30% |
| Ethyl alcohol | about 12 to about 42% |
| Stoddard solvent | about 4 to about 20% |
| Ethyl sulfate | about .01 to about 5% |
| Isopropyl alcohol | about 0.7 to about 10% |
| Organosiloxanes | about 0.1 to about 7.0% |
| Aqueous saline solution | balance. |

15. The composition of claim 14 consisting essentially of, in weight percent:

| | |
|---|---|
| Urethane | about 9% |
| Silicone | about 20% |
| Kerosene | about 15% |
| Ethyl alcohol | about 32% |
| Stoddard solvent | about 16% |
| Ethyl sulfate | about 2% |
| Isopropyl alcohol | about 5% |
| Organosiloxanes | about 0.5% |
| Aqueous saline solution | about 0.5%. |

16. A method for treating a compact disc comprising applying to a surface of said compact disc the composition of claim 15.

17. A method for treating a compact disc comprising applying to a surface of said compact disc the composition of claim 14.

* * * * *